US012783854B1

(12) United States Patent
Tang et al.

(10) Patent No.: US 12,783,854 B1
(45) Date of Patent: Nov. 3, 2026

(54) JUST-IN-TIME GENERATION OF DECODER LAYER FEATURES FOR AN EARLY EXIT DECODER

(71) Applicant: Amazon Technologies, Inc., Seattle, WA (US)

(72) Inventors: Peng Tang, La Verne, CA (US); Pengkai Zhu, Pasadena, CA (US); Srikar Appalaraju, Martinez, CA (US); Vijay Mahadevan, Los Angeles, CA (US); Raghavan Manmatha, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 373 days.

(21) Appl. No.: 18/542,124

(22) Filed: Dec. 15, 2023

(51) Int. Cl.
*G06N 3/0455* (2023.01)

(52) U.S. Cl.
CPC .................................. *G06N 3/0455* (2023.01)

(58) Field of Classification Search
CPC ............................................. G06N 3/00–99/00
USPC ...................................................... 706/1–902
See application file for complete search history.

(56) References Cited

U.S. PATENT DOCUMENTS

2016/0336964 A1* 11/2016 Khalil .................. H03M 13/114
2019/0266236 A1* 8/2019 Battach ................. G06F 40/216
2021/0012178 A1* 1/2021 Venkatesh ............... G06F 17/16
2021/0117728 A1* 4/2021 Lee ...................... G06V 10/464
2022/0398451 A1* 12/2022 Surya ...................... G06F 18/25
2023/0342278 A1* 10/2023 Padmanabha Iyer ........................ G06F 11/3442
2024/0020516 A1* 1/2024 Schuster .................. G06N 3/09
2024/0111965 A1 4/2024 Chung

OTHER PUBLICATIONS

Sun, "A Simple Hash-Based Early Exiting Approach For Language Understanding and Generation" arXiv Mar. 3, 2022 (Year: 2022).*
Li, "Accelerating BERT Inference for Sequence Labeling via Early-Exit" arXiv Jun. 14, 2021 (Year: 2021).*
Laskaridis, "Adaptive Inference through Early-Exit Networks: Design, Challenges and Directions" arXiv Jun. 9, 2021. (Year: 2021).*
Termritthikun, "EEEA-N ET: an early exit evolutionary neural architecture search" arXiv Aug. 13, 2021 (Year: 2021).*
Saeed, "Binary Early-Exit Network for Adaptive Inference on Low-Resource Devices" arXiv Jun. 17, 2022 (Year: 2022).*
Xin, Ji, et al. "DeeBert: Dynamic early exiting for accelerating BERT inference." Proceedings of the 58th annual meeting of the association for computational linguistics. 2020. (Year: 2020).*
Gormez, "E2CM: Early Exit via Class Means for Efficient Supervised and Unsupervised Learning" arXiv Jul. 11, 2022 (Year: 2022).*
(Continued)

*Primary Examiner* — Alan S Miller
(74) *Attorney, Agent, or Firm* — S. Scott Foster; Kowert, Hood, Munyon, Rankin & Goetzel, P.C.

(57) ABSTRACT

Just-in-time computation of decoder layer features is performed for an early exit decoder of a machine learning model. When generating an inference using an early exit decoder, decoder layer features that were not generated due to a prior early exit are identified. The identified decoder layer features are generated and then provided as input to a decoder layer feature during a decode step.

20 Claims, 8 Drawing Sheets

(56) References Cited

OTHER PUBLICATIONS

Pacheco, "Early-exit deep neural networks for distorted images: providing an efficient edge offloading" arXiv Aug. 25, 2021 (Year: 2021).*
Xie, "Elbert: fast albert with confidence-window based early exit" arXiv Jul. 1, 2021. (Year: 2021).*
Fei, Chenggong, et al. "Deecap: Dynamic early exiting for efficient image captioning." Proceedings of the IEEE/CVF Conference on Computer Vision and Pattern Recognition. 2022. (Year: 2022).*
Qendro, "High Frequency EEG Artifact Detection with Uncertainty via Early Exit Paradigm" arXiv Jul. 21, 2021 (Year: 2021).*
Yoon, "Hu Bert-ee: Early Exiting Hu Bert for Efficient Speech Recognition" arXiv Apr. 13, 2022 (Year: 2022).*
Gormez, "Pruning Early Exit Networks" arXiv Jul. 8, 2022 (Year: 2022).*
MaciejWotczyk, "Zero TimeWaste: Recycling Predictions in Early Exit Neural Networks" arXiv Dec. 5, 2021 (Year: 2021).*
Sabet, Amin, et al. "Temporal early exits for efficient video object detection." arXiv preprint arXiv:2106.11208 (2021). (Year: 2021).*
Bakhtiarnia, Arian, Qi Zhang, and Alexandros Iosifidis. "Single-layer vision transformers for more accurate early exits with less overhead." Neural Networks 153 (2022): 461-473. (Year: 2022).*
Tal Schuster, , et al., "Confident Adaptive Language Modeling," ArXiv Preprint: arXiv:2207.07061v2, Oct. 2022, pp. 1-24.
Alayrac, J.- B.; et al. 2022. "Flamingo: a visual language model for few-shot learning," Part of Advances in Neural Information Processing Systems 35 (NeurIPS 2022) Main Conference Track, 2022, pp. 1-21.
Srikar Appalaraju, et al., "DocFormer: End-to-End Transformer for Document Understanding," In Proceedings of the IEEE/CVF International Conference on Computer Vision, 993-1003, 2021.
Biten, A. F.; Litman, R.; Xie, Y.; Appalaraju, S.; and Manmatha, R., "Latr: Layout-aware transformer for scenetext vqa," In Proceedings of the IEEE/CVF Conference on Computer Vision and Pattern Recognition, pp. 16548-16558, 2022.
Biten, A. F.; Tito, R.; Mafla, A.; Gomez, L.; Rusinol, M.; Valveny, E.; Jawahar, C.; and Karatzas, D. 2019. "Scene text visual question answering". In Proceedings of the IEEE/CVF international conference on computer vision, pp. 4291-4301.
Chen, X.; Wang, X .; Changpinyo, S.; Piergiovanni, A.; Padlewski, P.; Salz, D.; Goodman, S.; Grycner, A.; Mustafa, B.; Beyer, L.; et al. 2022. "Pali: A jointly-scaled multilingual language-image model." Published as a conference paper at ICLR 2023, arXiv preprint arXiv:2209.06794v4 [cs.CV] Jun. 5, 2023, pp. 1-33.
Borisyuk, F.; Gordo, A.; and Sivakumar, V. 2018. "Rosetta: Large scale system for text detection and recognition in images". In Proceedings of the 24th ACM SIGKDD international conference on knowledge discovery & data mining, pp. 71-79, Retrieved from arXiv:1910.05085v1, 2019.
Chen, Y.-C.; Li, L.; Yu, L.; El Kholy, A.; Ahmed, F.; Gan, Z.; Cheng, Y.; and Liu, J. 2020. "Uniter: Universal image-text representation learning". In Computer Vision-ECCV 2020: 16th European Conference, Glasgow, UK, Aug. 23-28, 2020, Proceedings, Part XXX, pp. 104-120. Springer.
Elbayad, M.; Gu, J.; Grave, E.; and Auli, M. 2019. "Depth-adaptive transformer". arXiv preprint arXiv:1910.10073v4—Feb. 2020, pp. 1-15.
Geng, S.; Gao, P.; Fu, Z.; and Zhang, Y. 2021. "Romebert: Robust training of multi-exit bert". arXiv preprint arXiv:2101.09755, pp. 1-8.
Gordon, M. A.; Duh, K.; and Andrews, N. May 2020. "Compressing bert: Studying the effects of weight pruning on transfer learning". arXiv preprint arXiv:2002.08307, pp. 1-15.
Goyal, Y.; Khot, T.; Summers-Stay, D.; Batra, D.; and Parikh, D. 2017. "Making the V in VQA Matter: Elevating the Role of Image Understanding in Visual Question Answering" Proceedings of the IEEE Conference on Computer Vision and Pattern Recognition (CVPR), 2017, pp. 6904-6913.
Gu, J.; Bradbury, J.; Xiong, C.; Li, V. O.; and Socher, R. 2018. "Non-Autoregressive Neural Machine Translation". In International Conference on Learning Representations. Hinton, G.; Vinyals, O.; Dean, J.; et al. 2015. Distilling the knowledge in a neural network. arXiv preprint arXiv:1711.02281v2, pp. 1-13.
Jiao, X.; Yin, Y.; Shang, L.; Jiang, X.; Chen, X.; Li, L.; Wang, F.; and Liu, Q. 2020. "TinyBERT: Distilling BERT for Natural Language Understanding". In Findings of the Association for Computational Linguistics: EMNLP 2020, pp. 4163-4174, Retreived from arXiv:1909.10351v5, 2020, pp. 1-12.
Jacob Devlin, et al., "BERT: Pre-training of Deep Bidirectional Transformers for Language Understanding". In Proceedings of NAACL-HLT, pp. 4171-4186, Retrieved from arXiv:1810.04805v2, May 2019.
Lee, C.-Y.; Xie, S.; Gallagher, P.; Zhang, Z.; and Tu, Z. 2015. "Deeply-supervised nets". Proceedings of the Eighteenth International Conference on Artificial Intelligence and Statistics, PMLR 38:562-570, 2015.
Li, X.; Shao, Y.; Sun, T.; Yan, H.; Qiu, X.; and Huang, X.- J. 2021. "Accelerating BERT Inference for Sequence Labeling via Early-Exit". In Proceedings of the 59th Annual Meeting of the Association for Computational Linguistics and the 11th International Joint Conference on Natural Language Processing (vol. 1: Long Papers), pp. 189-199.
Lin, S.; Xie, H.; Wang, B.; Yu, K.; Chang, X.; Liang, X.; and Wang, G. 2022. "Knowledge Distillation via the Target-aware Transformer". In Proceedings of the IEEE/CVF Conference on Computer Vision and Pattern Recognition, pp. 10915-10924.
Liu, W.; Zhou, P.; Wang, Z.; Zhao, Z.; Deng, H.; and Ju, Q. 2020. "FastBERT: a Self-distilling BERT with Adaptive Inference Time". In Proceedings of the 58th Annual Meeting of the Association for Computational Linguistics, pp. 6035-6044 (retreived from arXiv:2004.02178v2, dated Apr. 2020, pp. 1-10).
Liu, Y.; Meng, F.; Zhou, J.; Chen, Y.; and Xu, J. 2021. "Faster Depth-Adaptive Transformers". Proceedings of the AAAI Conference on Artificial Intelligence, 35(15): pp. 13424-13432.
Lu, J.; Batra, D.; Parikh, D.; and Lee, S. 2019. "Vilbert: Pretraining task-agnostic visiolinguistic representations for vision-and-language tasks". Advances in neural information processing systems, pp. 1-11, NeurIPS 2019.
Lu, J.; Clark, C.; Zellers, R.; Mottaghi, R.; and Kembhavi, A. 2022. "Unified-io: A unified model for vision, language, and multi-modal tasks". arXiv preprint arXiv:2206.08916, pp. 1-33.
Mao, J.; Huang, J.; Toshev, A.; Camburu, O.; Yuille, A. L.; and Murphy, K. 2016. "Generation and comprehension of unambiguous object descriptions". In Proceedings of the IEEE conference on computer vision and pattern recognition, pp. 11-20.
Mathew, M.; Karatzas, D.; and Jawahar, C. 2021. "Docvqa: A dataset for vqa on document images". In Proceedings of the IEEE/CVF Winter Conference on Applications of Computer Vision, pp. 2200-2209.
Michel, P.; Levy, O.; and Neubig, G. 2019. "Are sixteen heads really better than one?" Advances in neural information processing systems, pp. 1-11.
Mishra, A.; Shekhar, S.; Singh, A. K.; and Chakraborty, A. 2019. "Ocr-vqa: Visual question answering by reading text in images". In 2019 international conference on document analysis and recognition (ICDAR), pp. 947-952. IEEE.
Paszke, A.; Gross, S.; Chintala, S.; Chanan, G.; Yang, E.; DeVito, Z.; Lin, Z.; Desmaison, A.; Antiga, L.; and Lerer, A. 2017. "Automatic differentiation in PyTorch". In 31st Conference on Neural Information Processing Systems (NIPS 2017), pp. 1-4.
W. Powalski, R.; Borchmann, Ł.; Jurkiewicz, D.; Dwojak, T .; Pietruszka, M.; and Pałka, G. 2021. Going full-tilt boogie on document understanding with text-image-layout transformer. In International Conference on Document Analysis and Recognition, pp. 732-747 (Retrieved from arXiv:2102.09550v3, pp. 1-18, Jul. 2021).
Qian, L.; Zhou, H.; Bao, Y.; Wang, M.; Qiu, L.; Zhang, W.; Yu, Y.; and Li, L. 2021. "Glancing Transformer for Non-Autoregressive Neural Machine Translation". In Proceedings of the 59th Annual Meeting of the Association for Computational Linguistics and the 11th International Joint Conference on Natural Language Processing (vol. 1: Long Papers), pp. 1993-2003.

(56) References Cited

OTHER PUBLICATIONS

Raffel, C.; Shazeer, N.; Roberts, A.; Lee, K.; Narang, S.; Matena, M.; Zhou, Y.; Li, W.; Liu, P.J.; et al. 2020. "Exploring the limits of transfer learning with a unified text-to-text transformer". The Journal of Machine Learning Research, vol. 21, Issue 1, Article No. 140, pp. 5485-5551.
Sanh, V.; Debut, L.; Chaumond, J.; and Wolf, T. 2019. "DistilBERT, a distilled version of BERT: smaller, faster, cheaper and lighter." arXiv preprint arXiv: 1910.01108v4, Mar. 2020, pp. 1-5.
Schwartz, R.; Stanovsky, G.; Swayamdipta, S.; Dodge, J.; and Smith, N. A. 2020. "The Right Tool for the Job: Matching Model and Instance Complexities". In Proceedings of the 58th Annual Meeting of the Association for Computational Linguistics, pp. 6640-6651.
Singh, A.; Natarajan, V.; Shah, M.; Jiang, Y.; Chen, X.; Batra, D.; Parikh, D.; and Rohrbach, M. 2019. "Towards vqa models that can read". In Proceedings of the IEEE/CVF conference on computer vision and pattern recognition, pp. 8317-8326.
Wang, P.; Yang, A.; Men, R.; Lin, J.; Bai, S.; Li, Z.; Ma, J.; Zhou, C.; Zhou, J.; and Yang, H. 2022. "Ofa: Unifying architectures, tasks, and modalities through a simple sequence-tosequence learning framework". In International Conference on Machine Learning, pp. 23318-23340. PMLR.
Wolf, T.; Debut, L.; Sanh, V.; Chaumond, J.; Delangue, C.; Moi, A.; Cistac, P.; Rault, T.; Louf, R.; Funtowicz, M.; et al. 2019. "Huggingface's transformers: State-of-the-art natural language processing". arXiv preprint arXiv:1910.03771v5, Jul. 2020, pp. 1-8.
Xin, J.; Tang, R.; Lee, J.; Yu, Y.; and Lin, J. 2020. Dee- "BERT: Dynamic early exiting for accelerating BERT inference". arXiv preprint arXiv:2004.12993v1, Apr. 2020, pp. 1-6.
Xin, J.; Tang, R.; Yu, Y.; and Lin, J. 2021. "BERxiT: Early exiting for BERT with better fine-tuning and extension to regression". In Proceedings of the 16th conference of the European chapter of the association for computational linguistics: Main vol. pp. 91-104.
Yu, L.; Poirson, P.; Yang, S.; Berg, A. C.; and Berg, T. L. 2016. "Modeling context in referring expressions". In Computer Vision-ECCV 2016: 14th European Conference, Amsterdam, The Netherlands, Oct. 11-14, 2016, Proceedings, Part II 14, 69-85. Springer (Retrieved form arXiv: 1608.00272v3, Aug. 2016, pp. 1-19.
Zhang, P.; Li, X.; Hu, X.; Yang, J.; Zhang, L.; Wang, L.; Choi, Y.; and Gao, J. 2021. "Vinvl: Revisiting visual representations in vision-language models". In Proceedings of the IEEE/CVF Conference on Computer Vision and Pattern Recognition, pp. 5579-5588.
Zhang, Z.; Zhu, W.; Zhang, J.; Wang, P.; Jin, R.; and Chung, T.- S. 2022. "PCEE-BERT: Accelerating BERT Inference via Patient and Confident Early Exiting". In Findings of the Association for Computational Linguistics: NAACL 2022, pp. 327-338. Seattle, United States: Association for Computational Linguistics.
Zhou, L.; Palangi, H.; Zhang, L.; Hu, H.; Corso, J.; and Gao, J., Apr. 2020. "Unified vision-language pre-training for image captioning and vqa". In Proceedings of the AAAI conference on artificial intelligence, vol. 34, pp. 13041-13049.
Zhou, W.; Xu, C.; Ge, T.; McAuley, J.; Xu, K .; and Wei, F. 2020b. "Bert loses patience: Fast and robust inference with early exit". Advances in Neural Information Processing Systems, 33: pp. 18330-18341, NeurIPS 2020.
U.S. Appl. No. 18/542,064, filed Dec. 15, 2023, Peng Tang, et al.
Mahabadi, et al., "Parameter-efficient Multi-task Fine-tuning for Transformers via Shared Hypernetworks," Proceedings of the 59th Annual Meeting of the Association for Computational Linguistics and the 11th International Joint Conference on Natural Language Processing (vol. 1: Long Papers), pp. 565-576, 2021.
Din, Alexander Yom,e t al., "Jump to Conclusions: Short-Cutting Transformers with Linear Transformations," arXiv:2303.09435v1, pp. 1-15, Mar. 2023.
Xin, et al., "BERxiT: Early Exiting for BERT with Better Fine-Tuning and Extension to Regression" Proceedings of the 16th Conference of the European Chapter of the Association for Computational Linguistics: Main Volume, pp. 91-104, 2021.
Xu, Guanyu, et al., "Lgvit: Dynamic early exiting for accelerating vision transformer," MM '23: Proceedings of the 31st ACM International Conference on Multimedia, pp. 9103-9114, 2023.
Schuster, Tal, et al., "Consistent Acceleratede Inference via Confident-Adaptive Transformers," Proceedings of the 2021 Conference on Empirical Methods in Natual Language Processing, pp. 4962-4979, 2021.

* cited by examiner

JUST-IN-TIME GENERATION OF DECODER LAYER FEATURES FOR AN EARLY EXIT DECODER

BACKGROUND

Machine-learned models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

Figure 1:
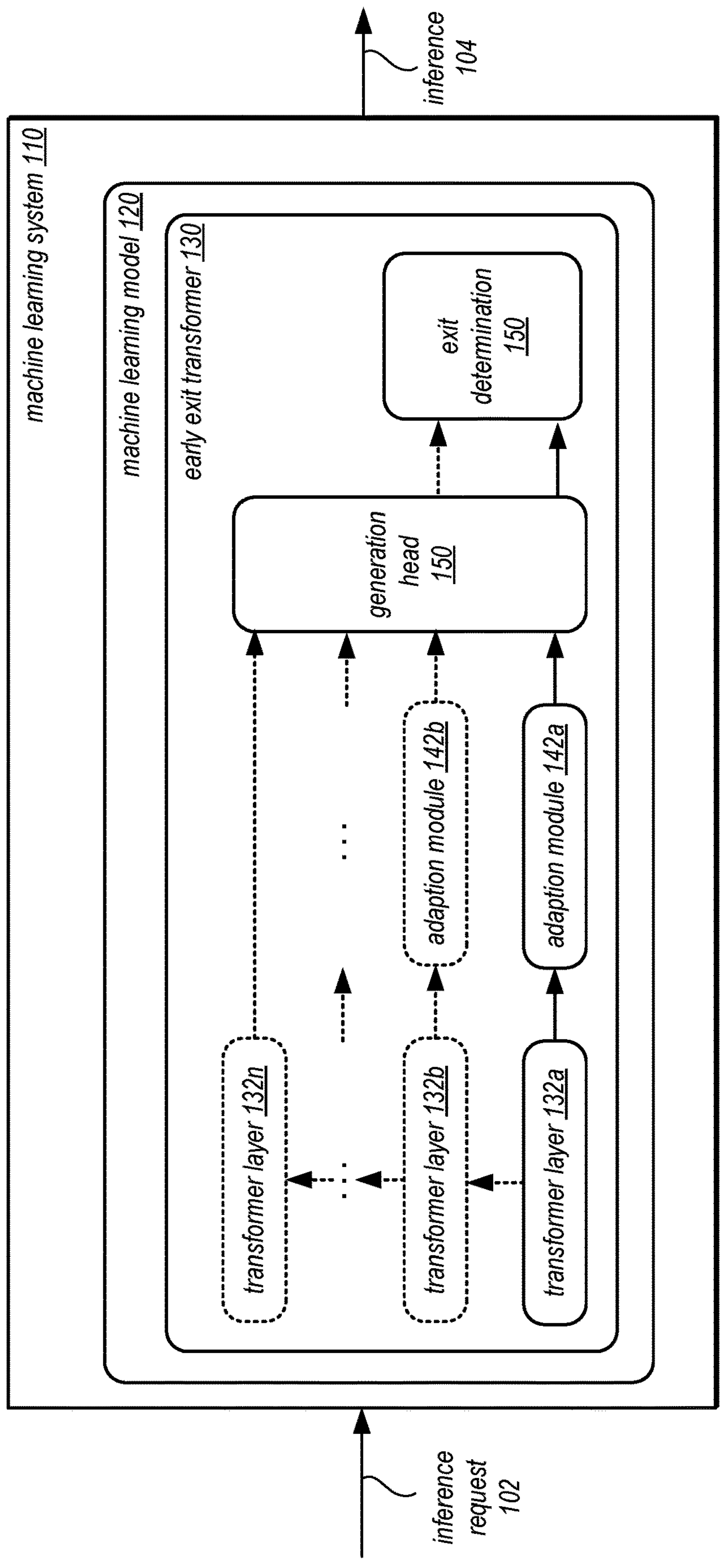
FIG. 1 illustrates a logical block diagram of a common generation head for an early exit transformer, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters.

Machine learning models may be used to perform various tasks. For example, Vision-Language (VL) tasks, such as Visual Question Answering (VQA) have drawn increasing attention in recent years. These tasks involve reasoning about image and texts at the same time. Among many machine learning models tackling these tasks, encoder-decoder transformer models usually show the best accuracy thanks to the strong generative ability of the decoder. Nevertheless, encoder-decoder models rely on autoregressive decoding to bring its ability into full play at inference.

Auto-regressive decoding may refer to a technique where each, each output of a decoder (sometimes referred to as a "token") is generated conditioned on previous outputs (e.g., previous tokens). Therefore, it has to generate tokens one after another, and repeat the feedforward in each layer as many times. This technique leads to high inference latency in the decoder, and makes the decoder take up most of the total inference latency. However, even using only one decoder layer, an encoder-decoder model can still achieve reasonable prediction accuracy. It follows that some predictions are correct by one decoder layer and do not need the excessive computations in the deeper decoder layers.

In various embodiments, techniques to dynamically allocate an adequate amount of computation at a particular decoding step may be implemented in order to speed-up inference without sacrificing accuracy. Specifically, a machine learning model with an early exit decoder may be implemented to dynamically determine whether or not to exit at a specific decoder layer at each decoding step. In various embodiments, a confidence score may be used to evaluate a potential result of a decoder layer at a decoding step using, for example, a confidence threshold for that layer.

Early exit decoding for an auto-regressive decoder presents technical challenges. One challenge is to get accurate predictions when the decoder exits early (e.g., before using all decoder layers). To address this challenge, each of the decoder layers may have to be trained to provide strong generative ability.

Another challenge involves semantic misalignment. Because tokens can be generated at different decoder layers at different decoding steps when using an early exit decoder, this approach would seem to violate another tenant of auto-regressive decoding that requires n-layer features from all the previous steps if the current step is inferring at layer n. If an exit for a prior decoding step did not need to advance to deeper layer, then those deeper layer features may not be available at a later step. This challenge, which may be referred to as semantic misalignment between different layers imposes difficulties when applying an early exit decoding technique, leading to degraded accuracy.

Previous approaches address the first challenge by using different prediction heads after each transformer layer. In contrast, in various embodiments, the model implements early exit decoding by sharing a common generation head (e.g., the same parameters or other features used to generate a token prediction and confidence score) among different decoder layers and training with deep supervision. For example, the generation head generates the output sequence prediction, such as the answer text for visual question answering or box coordinates for referring expression comprehension. Additionally, in various embodiments, an adaptation module is implemented between decoder layers and the generation head. This helps to strengthen the generative ability of shallow (e.g., earlier) decoder layers by sharing the common generation knowledge among different decoder layers. Moreover, to maintain the generative ability when exiting at the final layer, a loss function that emphasizes the learning of the final layer may be used when training the model. These techniques help to improve the accuracy of shallow decoder layers without sacrificing the accuracy at the final decoder layer.

To address the second challenge, in various embodiments, a technique is implemented that dynamically computes required deeper-layer features for previous decoding steps just-in-time (JIT). This technique effectively resolves the semantic misalignment among different layers at different generation steps. In contrast, existing techniques, use the shallow-layer features as the deeper-layer features directly for later decoding steps, failing to mitigate semantic misalignment and substantially undermining the generative ability of the model.

Although discussed above with regard to early exit decoders, techniques that utilize a common generation head may also be applicable to machine learning models that implement an early exit encoder and may provide similar performance advantages.

FIG. 1 illustrates a logical block diagram of a common generation head for an early exit transformer, according to some embodiments. Machine learning system 110 may be a standalone system, service, or application that makes use of a machine learning model, such as machine learning model 120, to perform various tasks. In some embodiments, machine learning system 110 may be implemented as part of a service of a provider network, such as machine learning service 410 discussed below with regard to FIG. 4.

Machine learning model 120 may be a trained machine learning model that implements early exit transformer130. Transformer 130 may be an encoder or a decoder. For example, early exit transformer 130 may be the decoder of an encoder-decoder machine learning model or the decoder of a decoder-only machine learning model. Similarly, early exit transformer 130 may be the encoder of an encoder-decoder machine learning model or the encoder of a encoder-only machine learning model. As discussed above, machine learning model 120 may use early exit transformer 130 to perform auto-regressive encoding or decoding techniques, where individual transformer 130 output steps may be used to condition subsequent transformer 130 outputs of later transformer steps. Machine learning model 120 may be one of various types of neural network-based machine learning models, where different features, modules or components of the machine learning model may be implemented as an artificial neural network (e.g., a collection of nodes and connections between the nodes). Machine learning model 120 may be used to perform inferences with respective various types or modalities of data (e.g., language, text, audio, image, video, etc.).

Machine learning system 110 may receive an inference request 102, which may include various input data (e.g., text, image, etc.) upon which or for which an inference 104 may be generated using machine learning model 120. As part of generating inference 104, early exit transformer 130 may implement a number of different transformer layers, 132*a*, 132*b*, and 132*n*. The inputs to these transformer layers may be the input data in the inference request or may be a transformed (e.g., encoded version of at least some of the input data). As discussed above, an early exit technique may be implemented so that an exit determination 150 is made at each transformer layer (until the last transformer layer 132*n*). In order to make the exit determination 150, the output of a current transformer layer (e.g., 132*a*) is modified by its corresponding adaption module (e.g., 142*a*), which may further transform the transformed output and provide the modified output to generation head 150.

As illustrated in FIG. 1, generation head 150 is shared across different transformer layers 132*a*-132*n*, accepting output of adaptation modules 142*a* and 142*b*. Because generation head 150 is shared, the values, parameters, or other information implementing generation head 150 may only be implemented once (e.g., only a single copy stored in memory), whereas adaption modules 142 (which may be significantly smaller than generation head 150) may be implemented for each transformer layer 132 that is not the last transformer layer (e.g., transformer layer 132*n*. In some embodiments, adaptation modules may be implemented as a linear layer followed by layer normalization. This results in computing resource savings over techniques that implement specific generation heads for each transformer layer (as noted above).

Generation head 150 may be implemented in different ways to provide a result from the modified transformer output along with a confidence score, indicating the likelihood that the result is accurate. For example, in some embodiments, a linear layer and softmax implementation of generation head 150 may be used. However, other architectures or components may be used in other embodiments.

Exit determination 150 may use the confidence score generated by generation head 150 to determine whether the result should be used for that transformer step. For example, a threshold (referred to as t in the example algorithm below), may be used where the next transformer layer is used if the confidence threshold is not met or exceeded. In some embodiments, different thresholds may be implemented for different transformer layers 132, or a same threshold may be applied for each transformer layer 132. As discussed below with regard to FIG. 5, the confidence threshold may be specified by a user interface.

As depicted in FIG. 1, a generation head is used to map transformer features into potential results (e.g., potential tokens). In contrast to existing work, because the generation head is shared across different transformer layers, the generation knowledge incorporated by the generation head is common among different transformer layers, strengthening the generative ability of shallow transformer layers (e.g., an earlier evaluated transformer layer may be considered shallower with respect to a later evaluated transformer layer, which may be referred to a deeper layer, where the shallowest layer is the first transformer layer evaluated and the deepest layer is the last transformer layer in the transformer. Additionally, as also depicted in FIG. 1, separate adaptation modules between the transformer layers and the generation head adapt the features from shallower transformer layers to the semantic space of features from the final transformer layer Consider the following example discussing training where early exit transformer is a decoder. To train model 120, one technique is to add deep supervision after outputs of each decoder layer as follows:

$$\mathcal{L}_{avg} = \frac{1}{N}\sum_{n=1}^{N}\mathcal{L}_n$$

where N, $\mathcal{L}_n$, $\mathcal{L}_{avg}$ correspond to the total number of decoder layers, the loss for the n-th decoder layer, and the average loss across all decoder layers, respectively. However, this approach does not optimize the model for the final decoder layer solely. As a result, the model can suffer from degraded accuracy of the final decoder layer, which will cap the accuracy of such an approach. To address this issue, the loss of the final layer can be emphasized during training so as to maintain high accuracy for the final decoder layer. To this end, the final decoder layer loss to the training objective as follows:

$$\mathcal{L} = \mathcal{L}_{avg} + \mathcal{L}_N$$

As discussed above, an auto-regressive decoding technique generates an inference step-by-step, (e.g., the decoder generates tokens step-by-step) and the generated output in each step is conditioned on the previously generated outputs. To do this the previous outputs are supposed to be input to the decoder to generate the current output. However, this would cause redundant computation for the previous outputs as their features have been computed at previous decoding steps. In one technique to reduce redundant computation, the previously generated decoder layer features (e.g., key-value features in the multihead self-attention layers) are all saved and provided for later steps. This practice allows the model not to re-compute the key-value features of the earlier decoding steps at later steps, thus decreasing computation complexity and reducing inference latency.

However, this technique cannot be used in early exit decoders that perform auto-regressive decoding. The number of layers used may not be aligned across the decoding steps (e.g., each decoding step may use a different number of decoder layers). As a result, the past features may not always be available at every layer. This misalignment creates challenge to perform auto-regressive decoding using early exit. Some techniques copy shallower-layer features to deeper-layers. However, the deeper-layer features encode higher-level semantics compared to shallower layer features.

A mixture of them across decoding steps will cause semantic misalignment and undermine the generative ability of the model. Alternatively, pre-computing the deeper-layer features is not efficient because it is not known how many layers the following steps will use. To address this issue, just-in-time computation of decoder layer features is implemented for an early exit decoder, in some embodiments.

Figure 2:
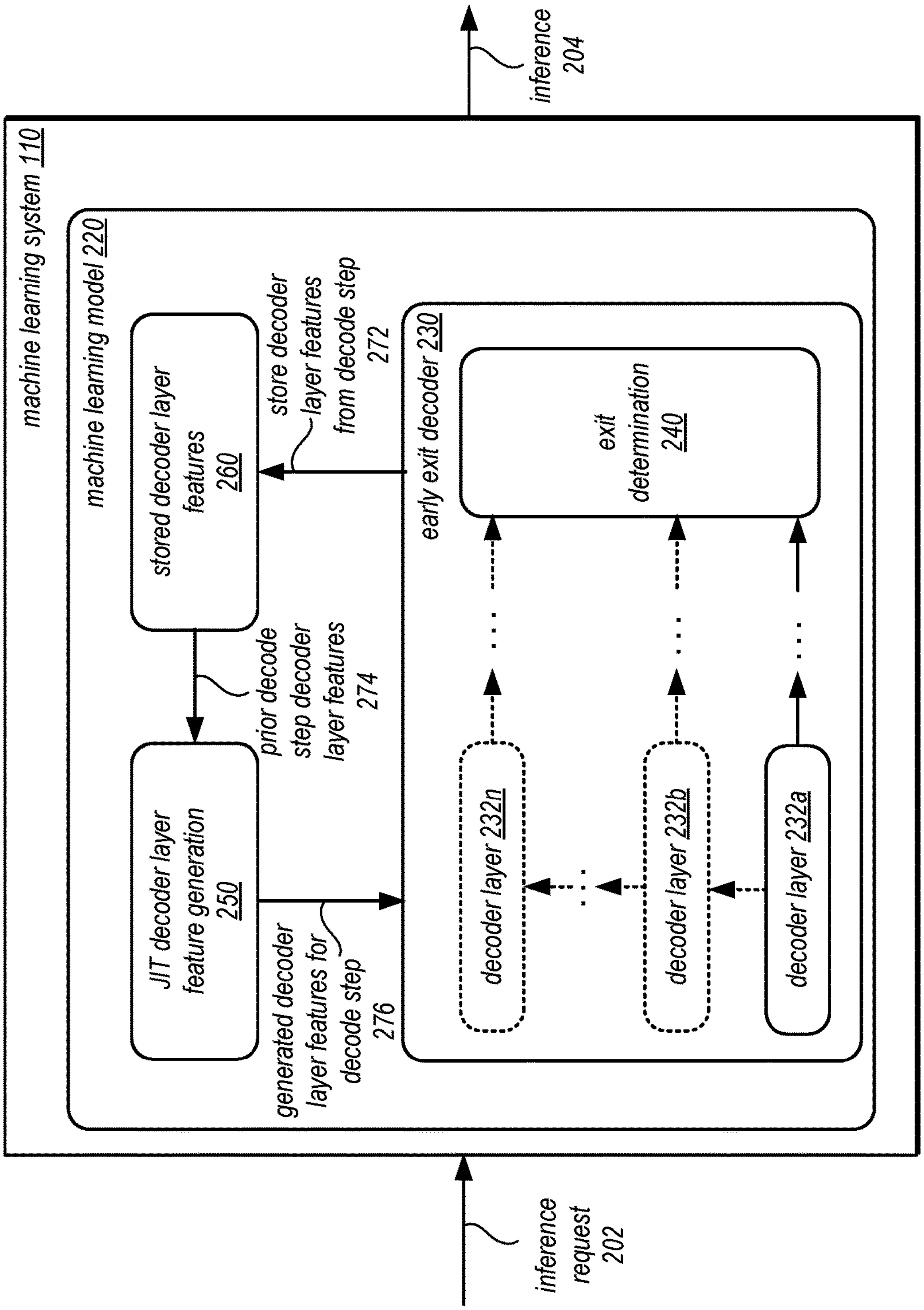
FIG. 2 illustrates a logical block diagram of just-in-time computation of decoder layer features for an early exit decoder, according to some embodiments.

FIG. 2 illustrates a logical block diagram of just-in-time computation of decoder layer features for an early exit decoder, according to some embodiments. Machine learning system 110 may be similar to the description in FIG. 1. Likewise, machine learning model 220 may be similar to machine learning model 120 discussed above with regard to FIG. 1. For example, machine learning model 220 may implement an early exit decoder 230 which may perform auto-regressive decoding to generate an inference 204 for an inference request 202. However, early exit decoder 230 may, in some embodiments, utilize a different arrangement of components, such as not utilizing the common generation head and adaptation modules. Instead, other embodiments, such as using layer-specific generation heads can be used.

For each decode step, early exit decoder 230 may generate some decoder layer features and store them, as indicated at 272, as part of stored decoder layer features 260. When a new decode step is begun, the prior decode step decoder features may be provided, as indicated at 274, to JIT decoder layer feature generation 260. JIT decoder layer feature generation 250 may identify, generate, and provide decoder layer features for a decode step as indicated at 276 when performing the new decode step using early exit decoder. An example illustrate is discussed in detail below with regard to FIG. 3.

For example, to avoid semantic misalignment and improve efficiency an algorithm to compute the past key-value features just-in-time may be performed by machine learning system 110. For step i and decoder layer n, the decoder layer n may be denoted as $D_n$, the past key value features as $$p_n^i,$$

the decoded token output as $$t_n^i,$$

the corresponding confidence score as $$c_n^i,$$

and the confidence score threshold as t. Colon separated numbers may be used to denote intervals, e.g., i:j denotes the decoding steps from i to j (inclusive). Apart from $$p_n^i,$$

any output hidden states $$h_n^i$$

of $D_n$ may be saved at step i if it is computed.

The following algorithm describes just-in-time generation of layer features:

---

Algorithm 1: Step-level dynamic early exit with just-in-time computation

---

Require: Current decoding step i, saved past key-value features $\mathcal{P} = \{p_n^{i'}\}$, saved hidden states $\mathcal{H} = \{h_n^{i'}\}$, decoder layers $\mathcal{D} = \{D_n\}$, the number of decoder layers N, confidence score threshold $\tau$.

Ensure: Decoded token output $t^i$.

1: for n = 1 to N do

2:     Get saved past key-value features $p_n^{1:j}$ and hidden states $h_{n-1}^{j+1:i}$.

3:     Feed $p_n^{1:j}$ and $h_{n-1}^{j+1:i}$ into $D_n$ to compute $p_n^{j+1:i}$, $h_n^{j+1:i}$, $t_n^i$ with confidence score $c_n^i$.

4:     Save $p_n^{j+1:i}$ to $\mathcal{P}$ and $h_n^{j+1:i}$ to $\mathcal{H}$.

5:     if $c_n^i > \tau$ then

6:         Set $t^i$ to $t_n^i$ and terminate the for loop.

7:     end if

8: end for

---

As shown in Algorithm 1, for each decoding step, go through the decoder one layer per iteration. At decoding step i, first prepare saved past key-value features $$p_n^{1:j}n$$

and hidden states $$h_{n-1}^{j+1:i}$$

(for the decoding steps where the key-value features are absent), where j (<i) corresponds to the sequence length of saved past key-value features for $D_n$, see line 2 in Algorithm 1. Next feed $$p_n^{1:j}$$

and $$h_{n-1}^{j+1:i}$$

into $D_n$ to compute key-value features $$p_n^{j+1:i},$$

hidden states $$h_n^{j+1:i},$$

decoded token output $$t_n^i,$$

and the corresponding confidence score $$c_n^i,$$

see line 3 in Algorithm 1. Save these newly computed $$p_n^{j+1:i},$$

and $$h_n^{j+1:i}$$

for future use, see line 4 in Algorithm 1.

Figure 3:
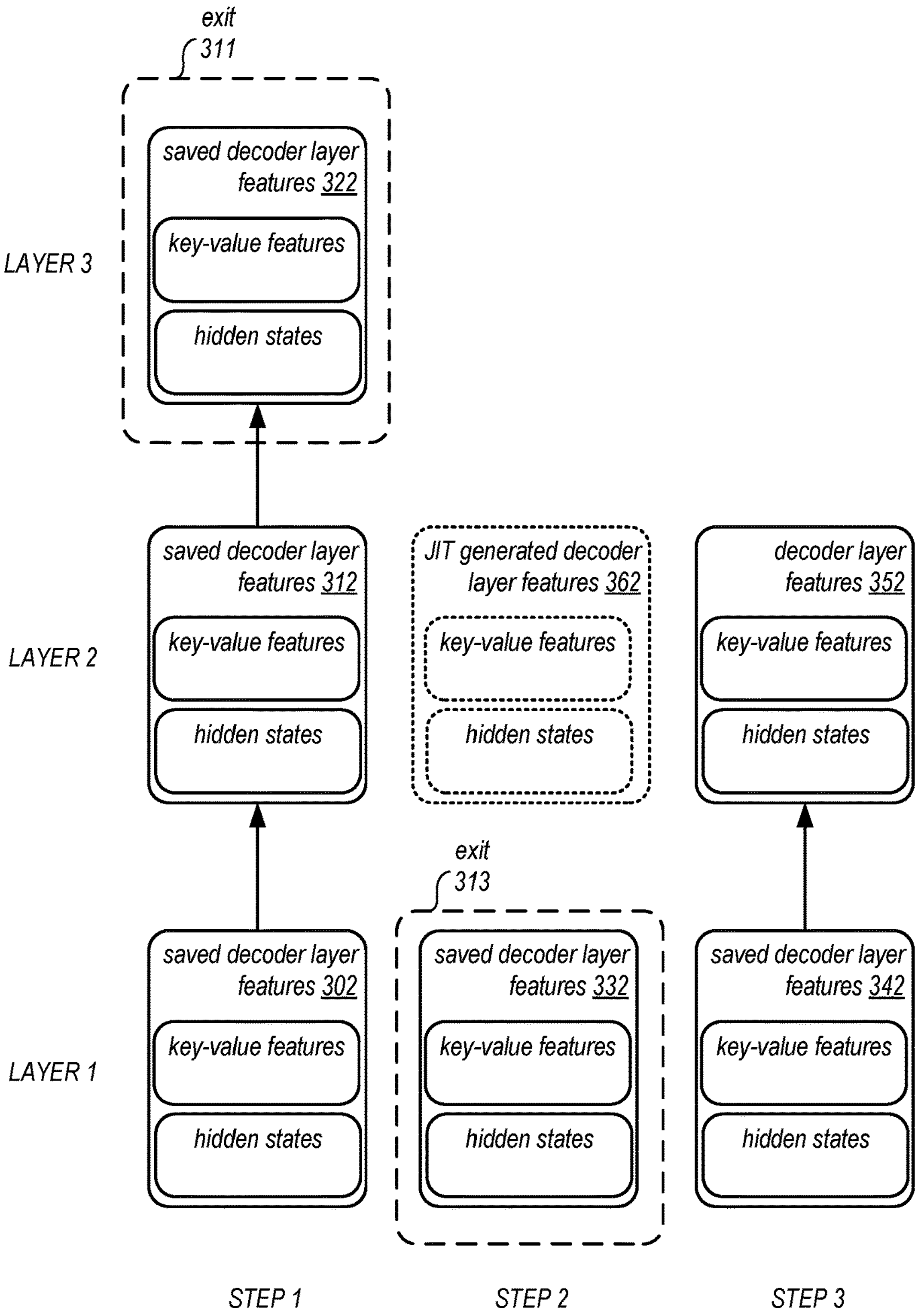
FIG. 3 is a logical diagram illustrating generated features for different decode steps of different decoder layers for an early exit decoder, according to some embodiments.

FIG. 3 is a logical diagram illustrating generated features for different decode steps of different decoder layers for an early exit decoder, according to some embodiments. Each decode step is illustrated at STEP 1, STEP 2, and STEP 3. Likewise, each decoder layer may be represented at LAYER 1, LAYER 2, and LAYER 3. Taking the decoding process in FIG. 3 as an example, decoding STEP 1, generated saved decoder layer features 302 at LAYER 1, saved decoder layer features 312 at LAYER 2, and saved decoder layer features 322 at LAYER 3, where STEP 1 exits, as indicated at 311. Decoding STEP 2, generated saved decoder layer features 332 at LAYER 1, where STEP 2 exits as indicated at 313. At decoding STEP 3 after generating saved decoder layer features 342 when the model is about to enter LAYER 2 (to generate decoder layer features 352), the past key-value features 332 are available (as exit 313 happened after LAYER 1) but 362 features are absent, so features 362 are generated just-in-time along with the saved hidden states that will be fed into decoder LAYER 2.

As discussed above in Algorithm 1, the same process for every decoder layer may be performed until the predicted confidence score $$c_n^i$$

larger than a threshold $\tau$, see line 5-6 in Algorithm 1. Although the deeper-layer features are computed for the previous decoding steps, the previous token outputs will not be updated with those features. This is because each token is supposed to be dependent on the past and any change in the previous tokens will break the dependency.

Algorithm 1 assumes that the $$h_{n-1}^{j+1:i}$$

is available at decoding step i. This is assured by per-layer traversal—the hidden states are always computed and saved at the previous decoder layer in this embodiment.

Please note that the previous descriptions are logical illustrations of a machine learning models and systems. Therefore, the previous illustrations are not to be construed as limiting as to other embodiments of a machine learning system that implements the above techniques.

This specification continues with a general description of a provider network that implements multiple different services, including a machine learning service, which may implement a common generation head for an early exit transformer and just-in-time computation of decoder layer features is implemented for an early exit decoder, according to some embodiments. Then various examples of, including different components/modules, or arrangements of components/module that may implement a common generation head for an early exit transformer and just-in-time computation of decoder layer features is implemented for an early exit decoder are discussed. A number of different methods and techniques to implement a common generation head for an early exit transformer and just-in-time computation of decoder layer features is implemented for an early exit decoder are then discussed, some of which are illustrated in accompanying flowcharts. Finally, a description of an example computing system upon which the various components, modules, systems, devices, and/or nodes may be implemented is provided. Various examples are provided throughout the specification.

Figure 4:
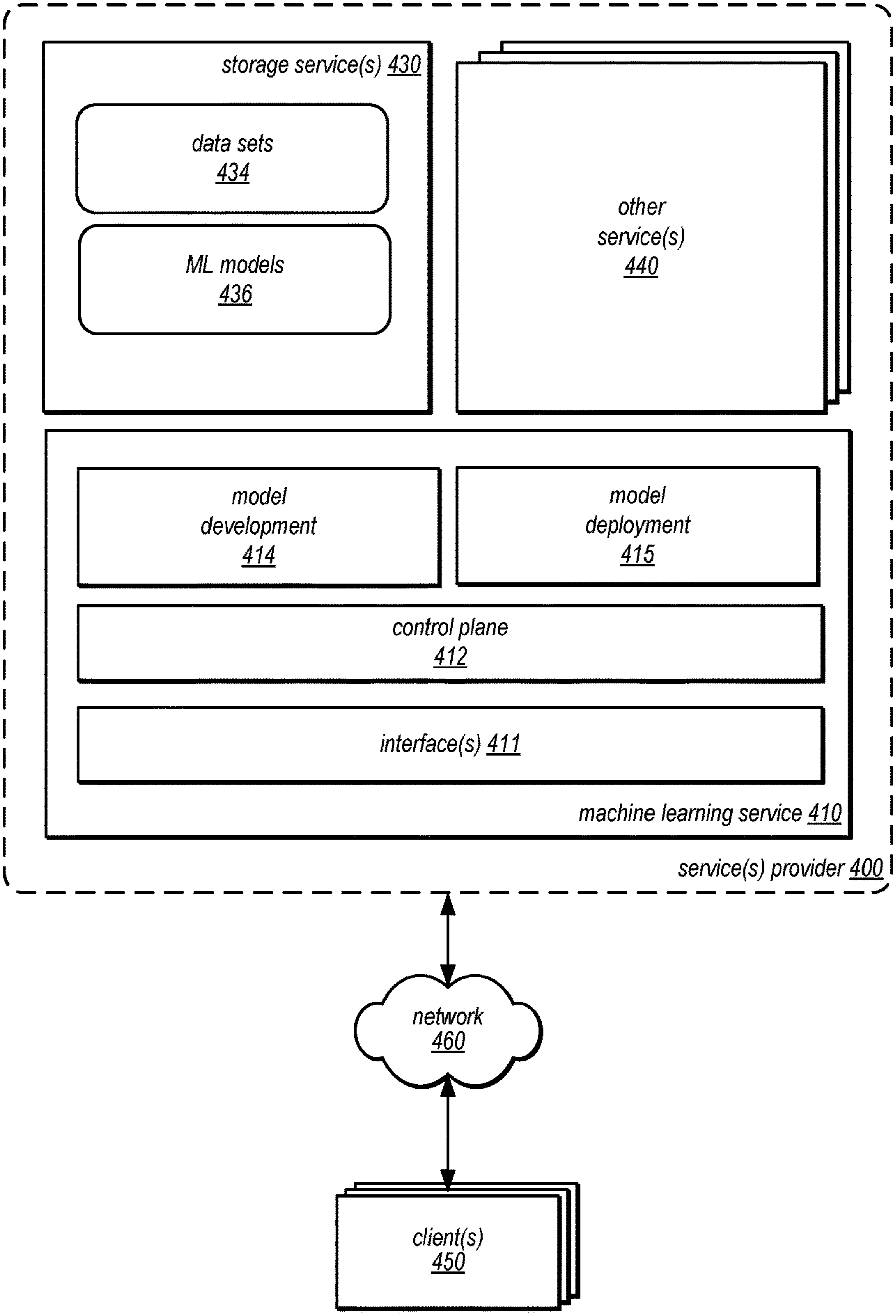
FIG. 4 illustrates an example provider network that may implement a machine learning service that implements a common generation head for an early exit transformer and just-in-time computation of decoder layer features for an early exit decoder, according to some embodiments.

FIG. 4 illustrates an example provider network that may implement a machine learning service that implements a common generation head for an early exit transformer and just-in-time computation of decoder layer features for an early exit decoder, according to some embodiments. Service(s) provider 400 may be a private or closed system or may be set up by an entity such as a company or a public sector organization to provide one or more services (such as various types of cloud-based storage) accessible via the Internet and/or other networks to clients 450, in one embodiment. Service(s) provider 400 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the service(s) provider 400, in one embodiment. In some embodiments, service(s) provider 400 may implement various computing resources or services, such as machine learning service 410, storage service(s) 430, and/or any other type of network-based services 440 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of machine learning service 410 may be implemented by a particular node or may be distributed across several nodes. In some embodiments, a given node may implement the functionality of more than one service system component (e.g., more than one data store component).

Machine learning service 410 may implement interface 411 to allow clients (e.g., client(s) 450 or clients implemented internally within service(s) provider 400, such as a client application hosted on another provider network service like an event driven code execution service or virtual compute service) to compress, train, and deploy machine learning models (e.g., neural networks), or various other machine learning model development, deployment, or analysis features. For example, machine learning service 410 may implement interface 411 (e.g., a graphical user interface, programmatic interface that implements Application Program Interfaces (APIs) and/or a command line interface) may be implemented so that a client can submit, edit, or otherwise implement various different model development and model deployment requests.

Machine learning service 410 may implement a control plane 412 to perform various control operations to implement the features of machine learning service 410. For example, control plane may monitor the health and performance of requests at different components, such as training as part of model development, execution of machine learning models as part of model deployment 415 or development and training of machine learning models as part of model development 414. For example, if a node or other component fails, a request fails, or other interruption occurs, control plane 412 may be able to restart a job to complete a request (e.g., instead of sending a failure response to the client). Control plane 412 may, in some embodiments, may arbitrate, balance, select, or dispatch requests to different node(s), in various embodiments. For example, control plane 412 may receive requests interface 411 which may be a programmatic interface, and identify an available node to begin work on the request.

Machine learning service 410 may implement model development 214 to develop, configure, program, define, and/or otherwise execute training jobs on various machine learning models using data sets, such as data sets 434 in storage services 430 across one or more training nodes (which may include one or more respective processing devices for training, such as GPUs). In some embodiments machine learning service 410 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, a development environment, and executed. Various tests or other development operations for machine learning models may also be performed. In some embodiments, the various files, configuration information, and other data for machine learning model development may be organized as a project (or other collection) and stored, versioned, or otherwise managed by model development 414 (e.g., as a collection of one or more files or data objects in storage services 430, including data sets 434 and ML models 436). Training jobs may be submitted to training nodes (e.g., via development environment or other interfaces) to train machine learning models on identified data set(s).

In various embodiments, machine learning service 410 may implement model deployment 415, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of service(s) provider 400 (e.g., a virtual compute service) and then the machine learning model deployed to that provisioned resource along with various software or other applications to support the receipt of requests for inferences and return inferences. As discussed in detail below with regard to FIG. 6, opaque fine-tuned machine learning models may be deployed, in some embodiments.

Data storage service(s) 430 may implement different types of data stores for storing, accessing, and managing data on behalf of clients 450 as a network-based service that enables clients 450 to operate a data storage system in a cloud or network computing environment. Data storage service(s) 430 may also include various kinds relational or non-relational databases, in some embodiments, data storage service(s) 430 may include object or file data stores for putting, updating, and getting data objects or files, in some embodiments. For example, one data storage service 430 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 430 may be treated as a data lake. For example, an organization may generate many different kinds of data, stored in one or multiple collections of data objects in a data storage service 430. The data objects in the collection may include related or homogenous data objects, such as database partitions of sales data, as well as unrelated or heterogeneous data objects, such as image data files (e.g., digital photos or video files) audio files and web site log files. Data storage service(s) 430 may be accessed via programmatic interfaces (e.g., APIs) or graphical user interfaces.

Generally speaking, clients 450 may encompass any type of client that can submit network-based requests to service(s) provider 400 via network 460, including requests for machine learning service 410 (e.g., a request to create or perform an explanation job, interact with development and management environment 413, etc.). For example, a given client 450 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 450 may be an application that can interact directly with service(s) provider 400. In some embodiments, client 450 may generate network-based services requests according to a Representational State Transfer (REST)-style network-based services architecture, a document- or message-based network-based services architecture, or another suitable network-based services architecture.

In some embodiments, a client 450 may provide access to service(s) provider 400 to other applications in a manner that is transparent to those applications. Clients 450 may convey network-based services requests (e.g., access requests to configure or perform explanation jobs) via network 460, in one embodiment. In various embodiments, network 460 may encompass any suitable combination of networking hardware and protocols necessary to establish network-based-based communications between clients 450 and service(s) provider 400. For example, network 460 may generally encompass the various telecommunications networks and service providers that collectively implement the Internet. Network 460 may also include private networks such as local area networks (LANs) or wide area networks (WANs) as well as public or private wireless networks, in one embodiment. For example, both a given client 450 and service(s) provider 400 may be respectively provisioned within enterprises having their own internal networks. In such an embodiment, network 460 may include the hardware (e.g., modems, routers, switches, load balancers, proxy servers, etc.) and software (e.g., protocol stacks, accounting software, firewall/security software, etc.) necessary to establish a networking link between given client 450 and the Internet as well as between the Internet and service(s) provider 400. It is noted that in some embodiments, clients 450 may communicate with service(s) provider 400 using a private network rather than the public Internet.

Figure 5:
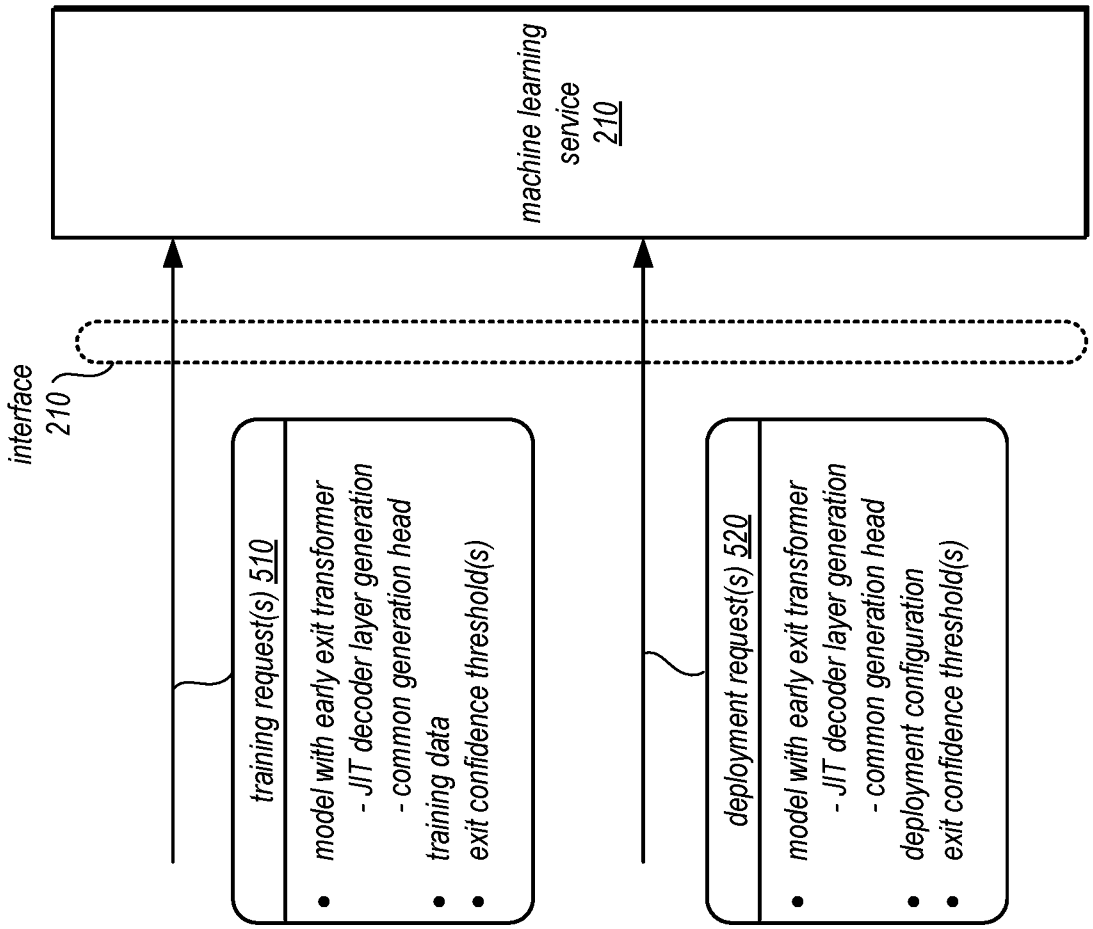
FIG. 5 is a logical diagram illustrating interactions with a machine learning service, including interactions for implementing a common generation head for an early exit transformer and just-in-time computation of decoder layer features for an early exit decoder, according to some embodiments.

FIG. 5 is a logical diagram illustrating interactions with a machine learning service, including interactions for implementing a common generation head for an early exit decoder and just-in-time computation of decoder layer features for an early exit decoder, according to some embodiments. One or more training requests 510 may be used to train a machine learning model, including one with an early exit transformer, as discussed above with regard to FIGS. 1 and 2. The model may be selected or specified to include a JIT decoder layer generation feature and/or a common generation head, for example. Training data may be specified as well as loss function similar to that discussed above that emphasizes the final transformer layer in training an early exit transformer. One or multiple exit confidence thresholds may be specified, in some embodiments (e.g., for one or more specific transformer layers or common across all transformer layers).

As indicated at 520, one or more deployment requests 520 may be supported. These may be used to select a previously trained model (e.g., offered by the service or having been specifically trained according to prior training requests 510). The machine learning model may include an early exit transformer, as discussed above with regard to FIGS. 1 and 2. The model may be selected or specified to include a JIT decoder layer generation feature and/or a common generation head, for example. A deployment configuration may include computing resources or performance characteristics of a host system and a location for deployment. One or multiple exit confidence thresholds may be specified, in some embodiments (e.g., for one or more specific decoder layers or common across all decoder layers).

Although FIGS. 4-5 have been described and illustrated in the context of a provider network implementing a machine learning service, the various components illustrated and described in FIGS. 4-5 may be easily applied to other machine learning systems. As such, FIGS. 4-5 are not intended to be limiting as to other embodiments.

Figure 6:
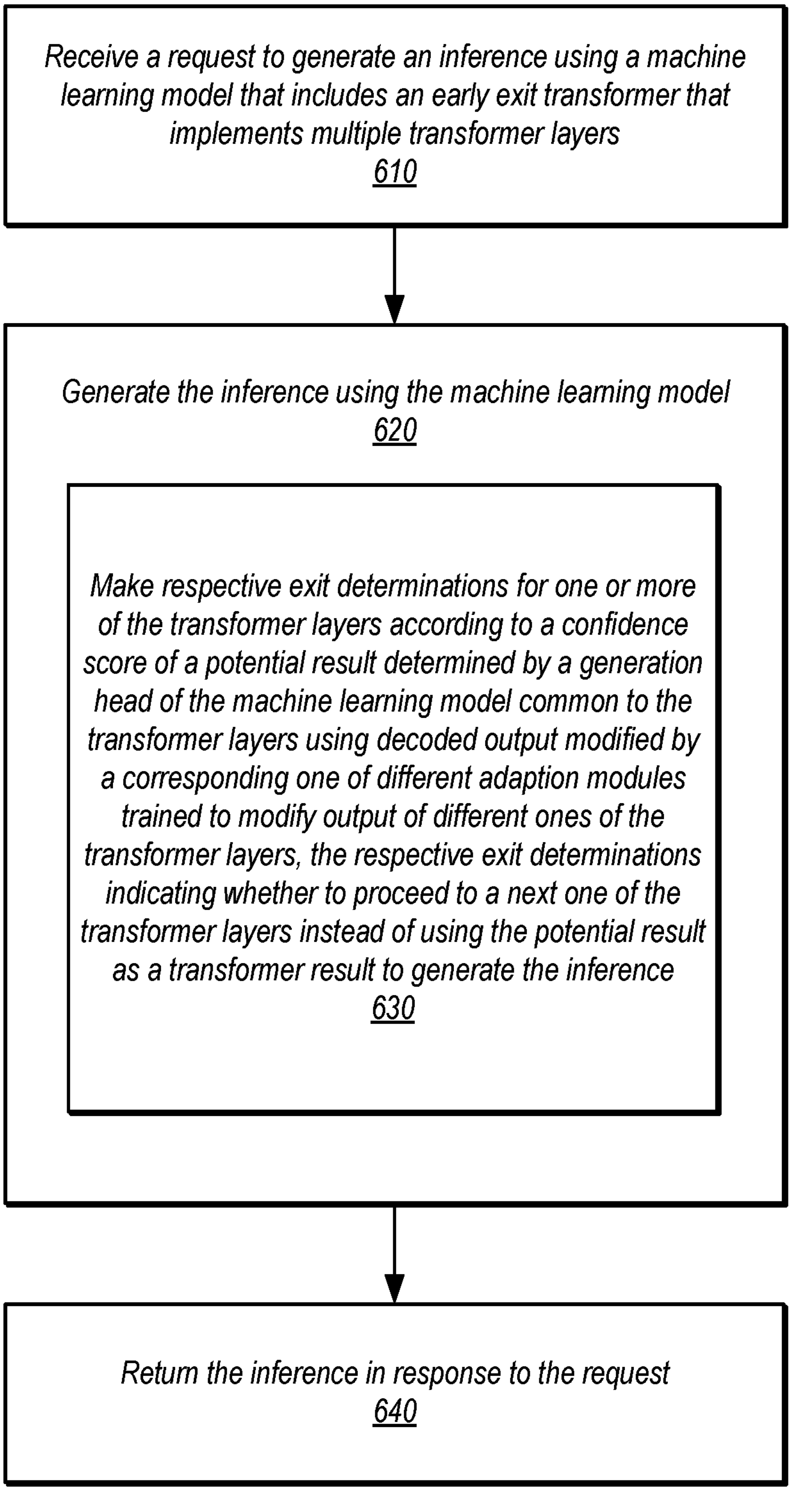
FIG. 6 is a high-level flowchart illustrating various methods and techniques for generating an inference using a machine learning model that implements a common generation head for an early exit transformer, according to some embodiments.

FIG. 6 is a high-level flowchart illustrating various methods and techniques for generating an inference using a machine learning model that implements a common generation head for an early exit decoder, according to some embodiments. As indicated at 610, a request to generate an inference using a machine learning model that implements multiple transformer layers is received. The request may be received via an interface of a system, like machine learning system 110, which may invoke generation of the inference. In some embodiments, the request may be received from a client application that utilizes the inference to perform downstream processing using the inference.

As indicated at 620, the inference is generated using the machine learning model. The model may or may not include other features in addition to the early exit transformer. For example, if the early exit transformer is a decoder, then an encoder that transforms input data into an encoded form upon which the early exit decoder operates may be implemented. A decoder-only machine learning model may not use an encoder but operate directly on the input data provided for the inference request. Similarly, an encoder-only machine learning model may implement early exit encoding techniques without using a decoder to generate an inference.

As indicated at 630, respective exit determinations are made for one or more of the transformer layers according to a confidence score of a potential result determined by a generation head of the machine learning model common to the transformer layers using decoded output modified by a corresponding one of different adaption modules trained to modify output of different ones of the transformer layers, in some embodiments. The respective exit determinations may indicate whether to proceed to a next one of the transformer layers instead of using the potential result as a transformer result to generate the inference. Multiple transformer steps may be performed to generate the inference. For example, different tokens to generate a text inference, predicate coordinates or other location information, or portions of a data object (e.g., patches of an image) may be decoded using multiple decoder steps.

As indicated at 640, the inference is returned in response to the request, in some embodiments. For example, the inference may be sent to the client application for further processing.

Figure 7:
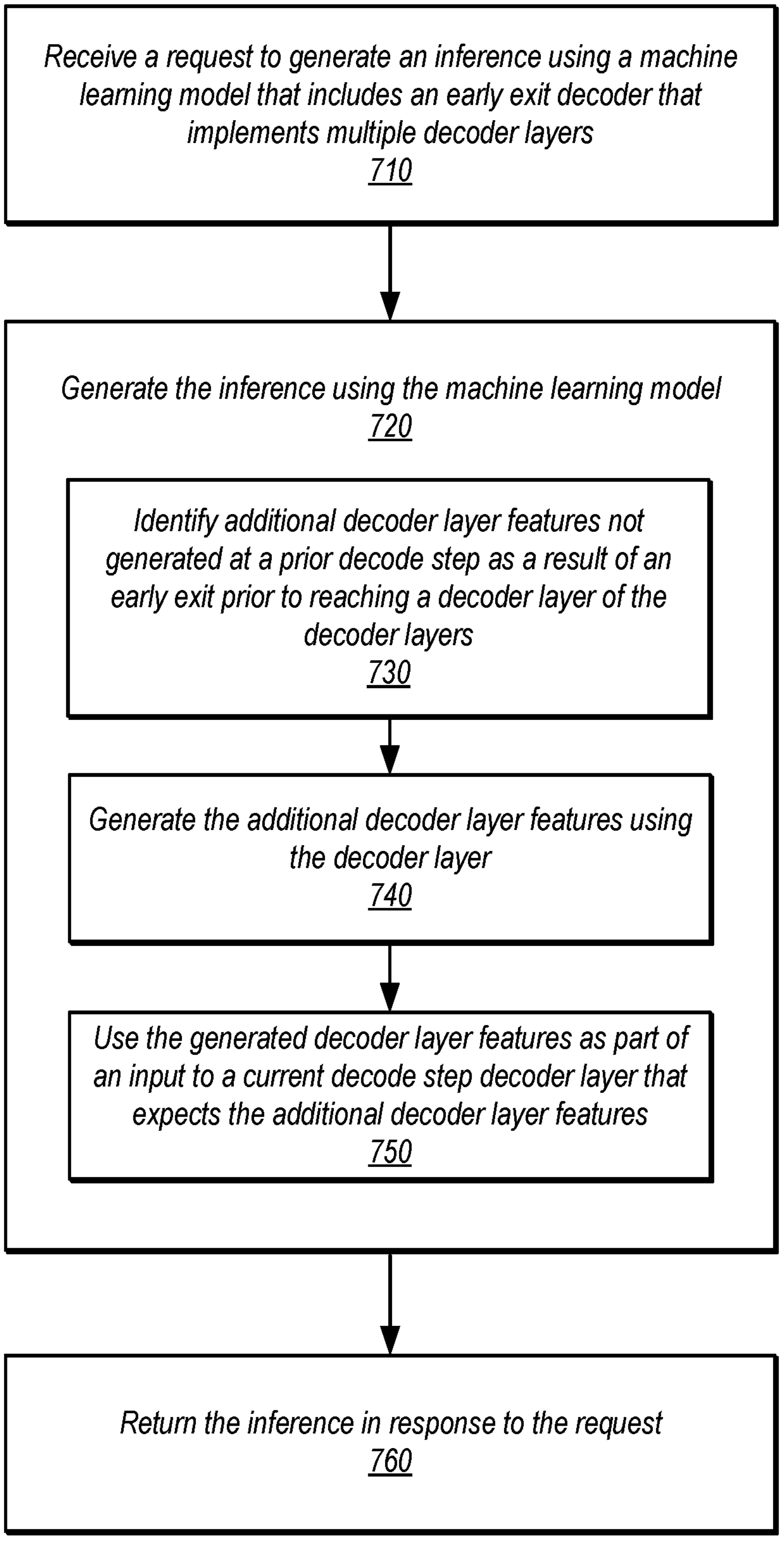
FIG. 7 is a high-level flowchart illustrating various methods and techniques for generating an inference using a machine learning model that implements just-in-time computation of decoder layer features for an early exit decoder, according to some embodiments.

FIG. 7 is a high-level flowchart illustrating various methods and techniques for generating an inference using a machine learning model that implements just-in-time computation of decoder layer features for an early exit decoder, according to some embodiments. As indicated at 710, a request to generate an inference using a machine learning model that implements multiple decoder layers is received (similar to element 610 in FIG. 6).

As indicated at 720, the inference is generated using the machine learning model. Similar to the discussion above with regard to element 620 in FIG. 6, the model may or may not include other features in addition to the early exit decoder, such as an encoder that transforms input data into an encoded form upon which the early exit decoder operations or may be a decoder-only machine learning model.

Multiple decoding steps may be performed to generate the inference. For example, different tokens to generate a text inference, predicate coordinates or other location information, or portions of a data object (e.g., patches of an image) may be decoded using the multiple steps. For one or more of the decoding steps, JIT computation may be performed. For example, as indicated at 730, additional decoder layer features are identified that were not generated at a prior decode step as a result of an early exit prior to reaching a decoder layer of the decoder layers. As indicated at 740, the decoder layer features are generated using the decoder layer. As indicated at 750, the generated decoder layer features are used as part of an input to a current decode step decoder layer that expects the additional decoder layer features (e.g., as illustrated in FIG. 3, where current decode step 3 expects JIT generated decoder layer features 362).

As indicated at 760, the inference is returned in response to the request, in some embodiments. For example, the inference may be sent to the client application for further processing.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
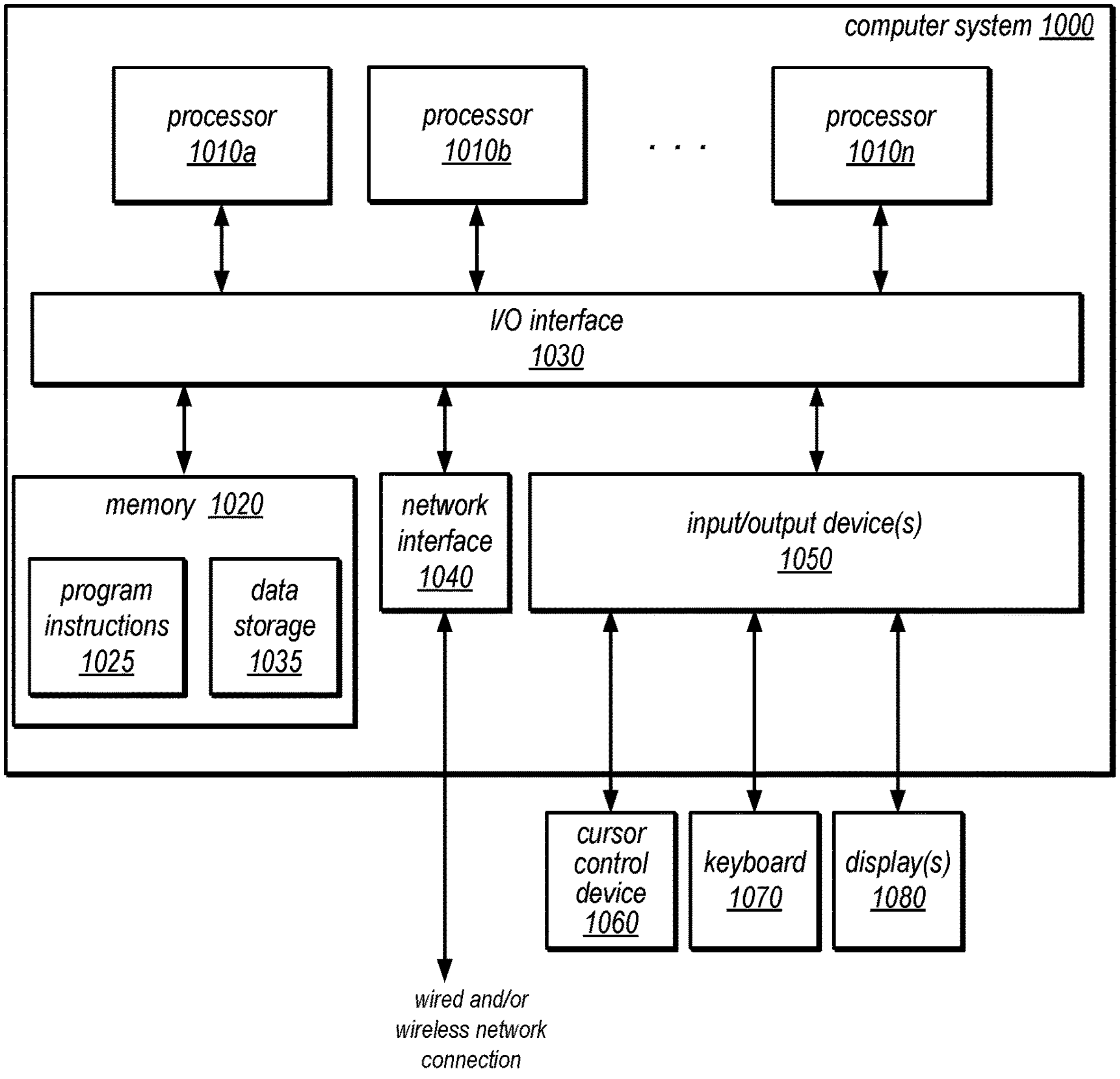
FIG. 8 illustrates an example system to implement the various methods, techniques, and systems described herein, according to some embodiments.

Embodiments of a common generation head for an early exit transformer and just-in-time computation of decoder layer features for an early exit decoder as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
- at least one processor; and
- a memory, storing program instructions that when executed by the at least one processor, cause the at least one processor to implement a machine-learning system, wherein the machine learning system is configured to:
  - receive a request to generate an inference using a machine learning model, wherein the machine learning model includes an early exit decoder, wherein the early exit decoder comprises a plurality of decoder layers for which individual exit determinations are made;
  - perform a plurality of decode steps to generate the inference using the machine learning model, wherein to perform the plurality of decode systems, the machine learning system is configured to:
    - for one or more decode steps of the plurality of decode steps:
      - access stored decoder layer features to identify additional decoder layer features not generated at a prior decode step as a result of an early exit prior to reaching a decoder layer of the plurality of decoder layers;
      - generate the additional decoder layer features using the decoder layer;
      - use the generated additional decoder layer features as part of an input to current decode step decoder layer that expects the additional decoder layer features; and
      - add the generated additional decoder layer features to the stored decoder layer features.

2. The system of claim 1, wherein the machine learning model further comprises an encoder that encodes input data obtained to generate the inference, wherein the encoded input data is provided to the early exit decoder to generate the inference.

3. The system of claim 1, wherein the machine learning model is trained to generate the inference as part of a visual question answering task.

4. The system of claim 1, wherein the machine learning system is a machine learning service that hosts the machine learning model as part of a provider network and wherein the request to generate the inference is received via an interface of the machine learning service.

5. A method, comprising:
- generating an inference using a machine learning model that includes an early exit decoder, wherein the early exit decoder comprises a plurality of decoder layers, and wherein the generating comprises:
  - for one or more decode steps:
    - identifying additional decoder layer features not generated at a prior decode step as a result of an early exit prior to reaching a decoder layer of the plurality of decoder layers;

generating the additional decoder layer features using the decoder layer; and using the generated decoder layer features as part of an input to a current decode step decoder layer that expects the additional decoder layer features.

6. The method of claim 5, wherein the machine learning model is a decoder-only machine learning model.

7. The method of claim 5, wherein the machine learning model further comprises an encoder that encodes input data obtained to generate the inference, wherein the encoded input data is provided to the early exit decoder to generate the inference.

8. The method of claim 5, wherein the early exit is determined using one of a plurality of different confidence thresholds, wherein the one confidence threshold is specific to a prior one of the plurality of decoder layers.

9. The method of claim 5, wherein the machine learning model is trained to generate the inference as part of a visual question answering task.

10. The method of claim 5, wherein the early exit is determined using a confidence threshold specified in a request.

11. The method of claim 5, wherein the early exit model generates the decoder layer features using a common generation head shared across the plurality of decoder layers and an adaptation module specific to the decoder layer.

12. The method of claim 5, further comprising adding the generated decoder layer features to stored decoder layer features for performance of a subsequent decode step.

13. The method of claim 5, wherein the machine learning model is hosted by a machine learning service implemented as part of a provider network and wherein the inference is generated in response to a request received via an interface of the machine learning service.

14. One or more non-transitory, computer-readable storage media, storing program instructions that when executed on or across one or more computing devices cause the one or more computing devices to implement:

generating an inference using a machine learning model that includes an early exit decoder, wherein the early exit decoder comprises a plurality of decoder layers, and wherein the generating comprises:

for one or more decode steps:

accessing stored decoder layer features to identify additional decoder layer features not generated at a prior decode step as a result of an early exit prior to reaching a decoder layer of the plurality of decoder layers;

generating the additional decoder layer features using the decoder layer; and using the generated additional decoder layer features as part of an input to a current decode step decoder layer that expects the additional decoder layer features.

15. The one or more non-transitory, computer-readable storage media of claim 14, wherein the machine learning model further comprises an encoder that encodes input data obtained to generate the inference, wherein the encoded input data is provided to the early exit decoder to generate the inference.

16. The one or more non-transitory, computer-readable storage media of claim 14, wherein the early exit is determined using one of a plurality of different confidence thresholds, wherein the one confidence threshold is specific to a prior one of the plurality of decoder layers.

17. The one or more non-transitory, computer-readable storage media of claim 14, wherein the machine learning model is trained to generate the inference as part of a visual question answering task.

18. The one or more non-transitory, computer-readable storage media of claim 14, wherein the early exit model generates the decoder layer features using a common generation head shared across the plurality of decoder layers and an adaptation module specific to the decoder layer.

19. The one or more non-transitory, computer-readable storage media of claim 14, storing further program instructions that when executed on or across the one or more computing devices cause the one or more computing devices to further implement adding the generated decoder layer features to stored decoder layer features for performance of a subsequent decode step.

20. The one or more non-transitory, computer-readable storage media of claim 14, wherein the one or more computing devices are implemented as part of a machine learning service that hosts the machine learning model as part of a provider network and wherein the inference is generated in response to a request received via an interface of the machine learning service.

* * * * *